Aug. 22, 1939.  N. F. ORTT  2,170,379
COLLAPSIBLE PET CASE
Filed April 12, 1938
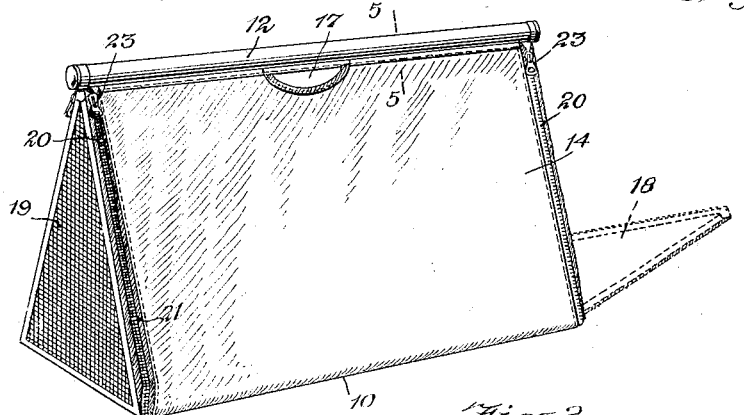
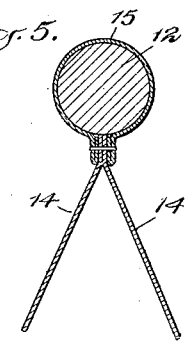
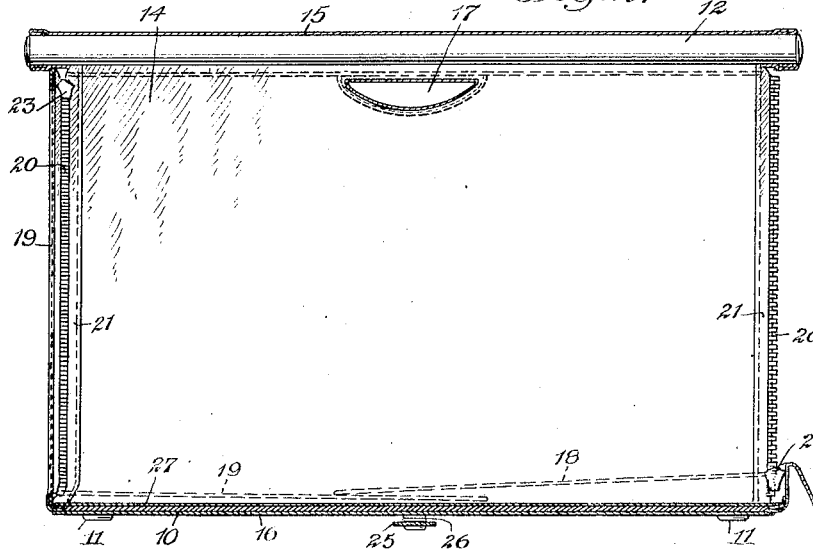
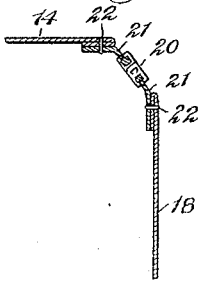
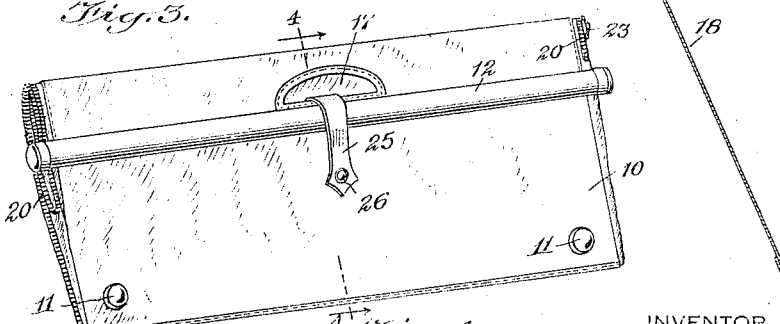
WITNESSES
INVENTOR
Nellie F. Ortt
BY
ATTORNEYS Patented Aug. 22, 1939

2,170,379

UNITED STATES PATENT OFFICE 2,170,379

COLLAPSIBLE PET CASE

Nellie F. Ortt, New York, N. Y.

Application April 12, 1938, Serial No. 201,533

1 Claim. (Cl. 119—19)

This invention relates to improvements in pet cases, particularly to pet cases to be used in carrying small animals such as dogs, cats and the like.

It is an object of the invention to provide an improved case of the above character which is so constructed as to afford ample space for the pet, which provides adequate ventilation, which may be conveniently carried, and which when not in use may be folded or collapsed into a relatively flat parcel.

Among other objects is the provision of an improved pet case of attractive appearance and which is inexpensive to manufacture but which is nevertheless of sturdy construction.

For a fuller understanding of the invention reference should be had to the accompanying drawing, in which:

Figure 1 is a perspective view of a pet case embodying my invention, showing in dotted lines one end of the case in open position;

Fig. 2 is a longitudinal sectional view of the case with one end in open position;

Fig. 3 is a view of the case in folded or collapsed position;

Fig. 4 is a sectional view in the direction of the arrows on the line 4—4 of Fig. 3, showing the case in folded or collapsed position;

Fig. 5 is a sectional view on the line 5—5 of Figure 1; and

Fig. 6 is a sectional view through one corner of the case, showing a portion of the end and side members and the connecting slide fastener.

A pet case embodying my invention preferably comprises a relatively rigid base member of sufficient area to provide ample room for the pet to be accommodated in the case, a relatively rigid supporting member spaced from the base member and positioned along the top of the case, and flexible side walls connected between the base and supporting members so that the case may be collapsed when it is not in use.

The base, indicated at 10 in the accompanying drawing, may be formed of any desired rigid material such as composition board, wood, plastic material or the like, and is preferably covered with some attractive material which may be the same as the material used for forming the flexible sides of the case. As previously stated, the base should be of sufficient size to accommodate the pet to be carried in the case. If desired, suitable supporting lugs such as the rounded metallic members 11 may be provided adjacent the four corners of the base. Adjacent the top of the case I provide a relatively rigid supporting member 12 which may be in the form of a rod or tube formed of suitable material such as wood, metal, plastic material or the like. The supporting member is preferably of substantially the same length as the base 10 although it may be slightly longer if desired, and is preferably of such a diameter as to fit conveniently in the hand of the carrier of the case, so as to serve as a supporting handle.

Connected between the base 10 and the supporting member 12 are a pair of side members 14, which, as shown, converge from the base to the supporting member so that the case is substantially triangular in cross section. The side members are formed of some suitable flexible material which is light in weight but is of sufficient strength to confine the pet carried in the case, and for this purpose I employ a textile material such as canvas, or I may employ leather or imitation leather.

As shown in the accompanying drawing the canvas or other material forming the sides 14 is preferably extended around the base as shown at 16, so as to lend an attractive, finished appearance to the case. Also material of the same character may be provided around the handle as shown at 15 and this is stitched to the sides 14.

To facilitate carrying the case, the sides 14 may be provided with apertures or cutaway portions as indicated at 17, adjacent the center of the case beneath the supporting member 12 so as to provide a convenient handle for carrying the case. In this way the fingers of the person using the case may be inserted through the openings 17 and the supporting member 12 adjacent the openings serves as a handle.

At is two ends the case is provided with substantially triangular end closures 18 and 19 which are secured to the base member and are provided with releasable connections with the side members 14, as by means of slide fasteners 20. One of the ends 18 may be formed of the same material as the sides 14, while the other end, 19, is preferably perforated so as to provide ventilation for the case. The perforated end should be formed of some material that will not be broken by the claws or teeth of the pet, and for this purpose I may employ netting made of gut or the like, or a wire screen mesh as shown. The connections between the sides of the case and the end closures 18 and 19 should likewise be of sufficient strength to resist any pressure exerted thereon by the animal in the case, and for this purpose I have found that slide fasteners of the so-called "zipper" type, as indicated at 20 are very satisfactory. The slide fasteners illustrated are of the conventional type which consists of two rows of mating teeth supported upon tapes 21 which are suitably connected to the sides and the end closures as by stitching 22. A slide 23 serves to engage and disengage the teeth.

It will be appreciated that when the case is in use the supporting member 12 will be raised upwardly above the base 10 and the end closures 18 and 19 will be attached to the sides 14 by means of the slide fasteners 20. When the case is in this condition it will be substantially triangular in cross section and will appear as shown in Figs. 1 and 2.

To collapse the case, the slide fasteners 20 are released and the end closures 18 and 19 are folded inwardly upon the bottom of the case as shown in dotted lines in Fig. 2. The side members 14 are then wrapped around the base and the supporting member 12 will rest upon the bottom of the base as shown in Figs. 3 and 4. It will be appreciated that the case will then be relatively flat and may be conveniently packed and transported from place to place. If desired, the case may be releasably held in collapsed position by means of a strap 25 secured to the bottom of the base, which may be extended through the handle openings 17 as shown in Figs. 3 and 4 and releasably connected at the other end to the base by means of the snap fasteners 26. If desired, the upper surface of the base may be provided with a covering of a suitable waterproof material as shown at 27.

When it is desired to use the case in transporting a pet the case is assembled as shown in Fig. 1 and the end 18 is released and opened outwardly as shown in dotted lines. The pet is then introduced through the open end of the case so as to face toward the perforated end 19. The end 18 is then raised upwardly and the slide fasteners 20 are closed. The case may then be grasped through the handle opening 17 and be readily transported from place to place. While in use the case will adequately confine the pet and prevent his escape. Due to the structure as shown and described herein it will be appreciated that the pet will have ample room and ventilation. It will also be appreciated that the case is light and easy to carry and is of very attractive appearance. When the case is not in use it may be collapsed or folded into a relatively small, flat form which may be readily carried or packed as desired.

It should be understood of course, that modifications may be made in the illustrated and described embodiment of my invention, such as varying the shape of the case and the materials employed in its construction, and such as providing the case with two perforated end closures instead of one.

It should also be understood that in addition to being suitable for carrying pets my case may be employed for carrying bathing suits and similar articles of wearing apparel where it is desirable to have ventilation through the case.

I claim:

A collapsible pet case comprising a relatively rigid rectangular base member at the bottom of the case, a relatively rigid elongated and attenuated supporting member provided adjacent the top of the case, side members formed of flexible material connected between the base and the supporting member so that the case is substantially triangular in cross section, said side members being provided with handle openings adjacent the supporting member, end closures connected to the base at the two ends of the case and having means for releasably securing them to the sides of the case at the ends thereof, one of said closures having openings to provide ventilation, and a strap secured to the bottom of the base member and provided with releasable fastening means, the strap being adapted to extend through the handle openings and retain the case in collapsed position.

NELLIE F. ORTT.